United States Patent

[11] 3,542,311

| [72] | Inventor | Elmer O. Wangerin |
| | | Rochester, New York |
| [21] | Appl. No. | 730,270 |
| [22] | Filed | May 20, 1968 |
| [45] | Patented | Nov. 24, 1970 |
| [73] | Assignee | Eastman Kodak Company |
| | | Rochester, New York |
| | | a corporation of New Jersey |

[54] REEL ADAPTOR
12 Claims, 5 Drawing Figs.

[52] U.S. Cl. .......................................... 242/197,
242/71.8
[51] Int. Cl. ......................................... G03b 1/04,
G11b 15/32, 23/04
[50] Field of Search........................................ 242/55.12,
55.13, 68.3, 71.1—71.8

[56] References Cited
UNITED STATES PATENTS

| 3,278,132 | 10/1966 | Camras et al. ............... | 242/68.3 |
| 3,341,831 | 8/1967 | Bradt........................... | 242/55.13 |
| 3,371,882 | 3/1968 | Orlando et al. ............... | 242/55.13 |
| 3,375,990 | 4/1968 | Hultgren ..................... | 242/55.13 |

Primary Examiner—Leonard D. Christian
Attorneys—Robert W. Hampton and G. Herman Childress

ABSTRACT: A film-handling device provided with film-threading means which cooperate with film guide elements defined by the magazine structure of magazine-loaded film supply reels is converted to accommodate unenclosed film supply reels by an adaptor unit removably mounted to the device to provide analogous film guide elements for an unenclosed film reel installed in the adaptor unit.

Patented Nov. 24, 1970
3,542,311
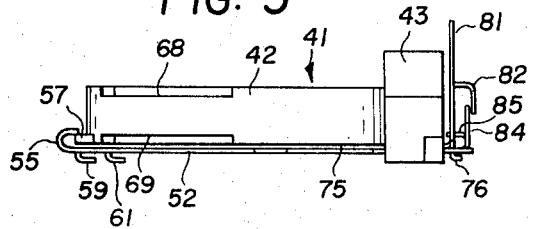
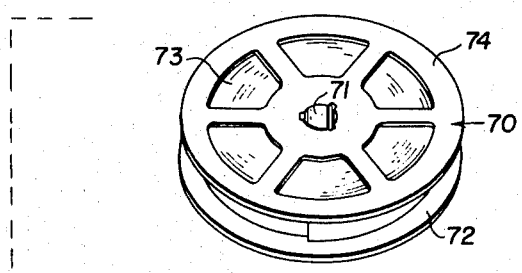
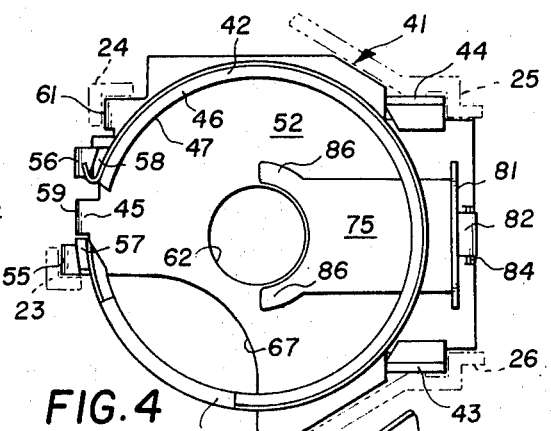
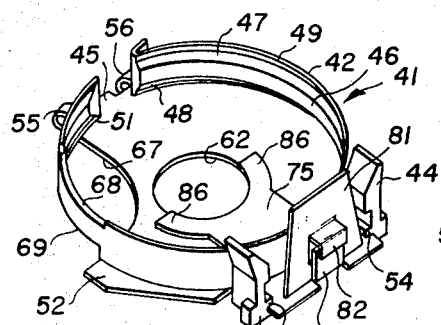
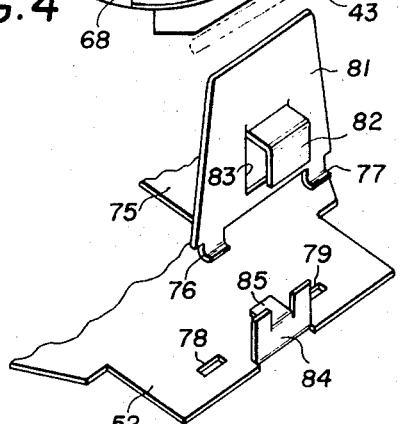
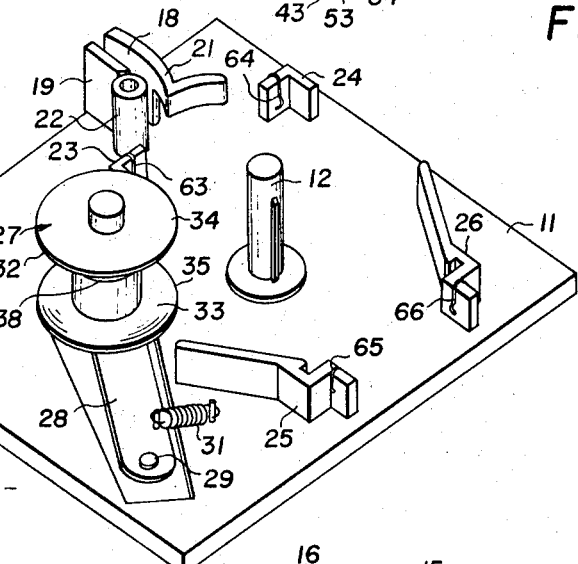
ELMER O. WANGERIN
INVENTOR.
BY J. Herman Childress
Robert W. Hampton
ATTORNEYS

3,542,311

REEL ADAPTOR

BACKGROUND OF THE INVENTION

1. Field of the Invention

The present invention relates to film-threading systems for film-handling devices such as film readers, film projectors, tape recorders, or the like, and more particularly to means for converting such devices to accommodate either magazine-loaded film supply reels or corresponding unenclosed film supply reels. Still more particularly, the invention relates to an adapter unit for allowing unenclosed film supply reels to be accommodated by a film-threading system of the type disclosed in commonly assigned copending U.S. Pat. application Ser. No. 591,235, entitled "Strip Material Storage and Feed Arrangement", filed in the name of Norman J. Rosenburgh on Nov. 1, 1966, in which the magazine structure of magazine-loaded film supply reels provides operative elements of the threading system.

2. Description of the Prior Art

In the film-threading system disclosed in the above-identified U.S. Pat. application, a film supply reel is partially enclosed in a magazine member which laterally encircles the film roll on the reel except at a predetermined throat opening through which the leading end of the film can be withdrawn from the magazine. When the film supply magazine is installed on a film-handling device provided with such a threading system, its throat opening is positioned in alignment with a film guide channel and its film reel is rotatably supported by a rotatable spindle member. During the threading operation, the reel is driven in an unwinding direction by the spindle member and the reel flanges are flexed together at a predetermined position to exert a transverse squeezing influence on successive increments of the outermost convolution of film on the reel. This squeezing influence on the leading end of the film causes it to separate tangentially from the film supply roll into contact with internal guide surfaces of the magazine member, by which it is guided into the magazine throat. As the film emerges from the magazine throat, it enters a guide channel defined by the film-handling device and is thereby directed through a film gate or the like and to a self-threading takeup reel.

Since the internal magazine surfaces thus serve an essential function in the operation of the threading system, it will be apparent that film cannot be threaded properly if an unenclosed film supply reel is simply mounted on the reel spindle. To distinguish between a reel incorporated in a film magazine as described above and one herein referred to as an "unenclosed" reel, the latter term will be understood to imply a reel which, when removed from the film-handling device, is devoid of film guide means for laterally constraining and guiding the outer convolution of the film roll wound thereon. The reels incorporated in the aforementioned film magazines, however, can be substantially identical to conventional unenclosed reels commonly used to store filmstrips or the like for use in manually threaded film-handling devices. Therefore, to use such unenclosed reels in the subject type of self-threading device, it is necessary presently either to provide each such reel with its own magazine member or to apply a magazine member to each unenclosed reel before it is used and then remove it afterwards, for use with the succeeding reel. Although the magazine members per se can be relatively inexpensive, providing a large number of unenclosed reels with such magazine members nevertheless can be quite costly, particularly if new storage facilities are dictated by the resulting increase in size of the film units. As an alternative, however, the process of applying a magazine unit to an unenclosed reel before it is installed on a self-threading film-handling device, and then removing it afterwards, obviously detracts from the advantages of the self-threading system in view of the time and manual dexterity required by such operations.

SUMMARY OF THE INVENTION

To enable a self-threading, film-handling device of the type described above to accommodate either film supply magazine or unenclosed film reels similar to those embodied in such magazines, the present invention provides a simple and reliable adapter unit which is temporarily mounted to the device by the same locating means which are employed to orient a film magazine in its operative position. The adapter unit, in turn, includes a rim member which provides the same film-guiding function as the film magazine member when a reel is installed in the adapter. Such installation of the reel into the adapter is accomplished simply by pressing the unenclosed film reel onto the spindle and past the rim member; the latter being sufficiently resilient to expand around the reel flanges and thereafter to protrude inwardly between the edges thereof.

In as much as the adapter unit remains in place on the film-handling device as long as unenclosed film reels are being used therewith, it is also provided with novel reel ejector means for removing reels therefrom without disturbing the location of the adapter unit. If the threading system of the device is adapted to operate with magazine-loaded film reels of different axial dimensions corresponding to different filmstrip width, as disclosed, for example, in commonly assigned pending U.S. Pat. application Ser. No. 730,222, entitled, "Self-Threading Take-up Reel" and filed in the name of Elmer O. Wangerin on May 20, 1968, the same adapter unit can likewise accommodate corresponding unenclosed film reels of different axial dimensions.

These and other advantages and novel features realized in accordance with the invention will be apparent from the following detailed description of an illustrative preferred embodiment thereof, reference being made to the accompanying drawings in which like reference characters refer to like elements.

BRIEF DESCRIPTION OF THE DRAWINGS

In the accompanying drawings:

FIG. 1 is an exploded, perspective view of a reel adapter unit comprising a preferred embodiment of the invention, showing the manner in which such a unit is installed on the corresponding portion of a self-threading film reader device or the like to receive an unenclosed film supply reel;

FIG. 2 is a perspective view of a magazine-loaded film supply reel adapted to be accommodated by the same film reader structure shown in FIG. 1;

FIG. 3 is an enlarged side elevational view of the reel adapter shown in FIG. 1;

FIG. 4 is a plan view of the reel adapter illustrated in FIGS. 1 and 3; and

FIG. 5 is an enlarged exploded perspective view of the pivot structure by which the reel ejector member is attached to the base plate of the adaptor unit.

DESCRIPTION OF THE ILLUSTRATIVE PREFERRED EMBODIMENT

By reference to FIG. 1, it will be seen that a film reader or related device of the type to which the present invention relates, includes a generally horizontal support plate 11 surrounding a rotatable, vertical film supply spindle 12 which is rotatably driven by means not shown. A magazine-loaded film reel intended for use with the illustrated film threading system is shown in FIG. 2 and comprises a film reel 13, which is surrounded by a magazine member 14 generally similar to the structure disclosed in the above-mentioned Rosenburgh patent application. The magazine member 14 includes an internal circular rim, not shown, which extends inwardly between the peripheral edges of the reel flanges to provide a circular film guide surface encircling a film roll 15, except at an opening or throat 16 through which film can be withdrawn from the magazine. When the magazine member 14 is mounted on the reader, spindle 12 is received in central bore 17 of the film reel 13, in driving engagement therewith, thereby establishing the rotational axis of the reel 13. When the film magazine is installed on the film reader, the magazine member 14 must be positioned in concentric relation with the reel 13 with its throat 16 in alignment with film guide channel 18 defined by stationary guide walls 19 and 21 and by guide roller 22. For this purpose, support plate 11 is provided with a plurality of positioning lugs shown at 23 through 26, which mate with corresponding lateral surfaces of the magazine member 14 when the latter is in its installed position adjacent the support plate 11. Between positioning lugs 23 and 25, a threading roller 27 is rotatably mounted on a support arm 28 pivoted to the support plate 11 by pin 29 and urged toward the reel spindle 12 by a spring 31. As the magazine member 14 is being installed, the roller 27 is moved manually aside and then released so that opposed conical surfaces 32 and 33 of its respective upper and lower flanges 34 and 35 enter respective recesses 36 and 37 (see FIG. 2) in the magazine member 14 to engage and squeeze the corresponding flanges of reel 13 as described in the above-mentioned Rosenburgh application. Thus, when the reel spindle 12 is rotated, by means not shown, to drive the supply reel 13 in an unwinding direction, the leading end of the film on the supply reel 13 emerges from the magazine throat 16 and enters guide channel 18, as previously described. In accordance with the invention disclosed in the above-identified U.S. Pat. application Ser. No. 591,235, the illustrated threading roller 27 also includes an intermediate downwardly facing conical surface 38. Accordingly, the threading system can accommodate film reels of two different axial sizes, for example either 35 mm. or 16 mm. film reels, by engaging the flanges of the 35 mm. reels between the outermost conical roller surfaces 32 and 33 and by similarly engaging the flanges of the 16 mm. reels between the intermediate conical roller surface 38 and the conical surface 33 of the lower roller flange.

The illustrated reel adapter unit 41 comprises a generally circular rim member 42 formed integrally with a pair of support elements 43 and 44 and including an opening 45 defining a film throat analogous to that of the film magazine. Within the rim member 42, a smooth cylindrical film guide surface 46 is joined by outwardly tapering surfaces 47 and 48 to respective upper and lower cylindrical lips 49 and 51. The rim member 42 is formed of a resilient material, preferably plastic, and is attached to a base plate 52, which is received in slots 53 and 54 in the corresponding support elements 43 and 44. Adjacent the portions of the rim member 42 defining the film throat, the base plate 52 includes a pair of guide lips 55 and 56. These guide lips 55 and 56 receive respectively lugs 57 and 58 on the rim member 42, thereby allowing the free ends of the rim member 42 to expand outwardly but preventing them from separating from the base plate 52. Additionally, two downwardly turned ears 59 and 61 are provided at the same end of the base plate 52 to provide support surfaces coplanar with the lower surfaces of support elements 43 and 44 so that the base plate 52 is supported in parallel relation to the flat surface of support plate 11 on which the adapter unit 41 rests.

To install the adapter unit 41 on the reader device, threading roller 27 is moved manually aside as previously explained and the adapter unit 41 is pushed downwardly onto support plate 11 between positioning lugs 23 through 26 with spindle 12 extending upwardly through central hole 62 in the adapter base plate 52. By reference to FIG. 4, which shows the positioning lugs 23 through 26 in phantom lines, it will be apparent that those lugs thus cooperate with corresponding edge surfaces of the adapter base plate 52 and with the support elements 43 and 44 of the rim member 42 to locate the adapter unit 41 in concentric relation to spindle 12 with the rim opening 45 in alignment with film guide channel 18. As shown in FIG. 1, resilient wire clip detent members 63 to 66 are provided respectively on the four positioning lugs 23 and 26 to engage corresponding edges of the base plate 52 so that the adapter unit 41 can be removed from the film reader only by pulling the adapter unit 41 upwardly with sufficient force to overcome the resiliency of the detent members 63 to 66.

When the adapter unit 41 is located on the reader device, as just described, the lower and intermediate conical reel engaging surfaces 32 and 33 of threading roller 27 are aligned with opening 67 in the base plate 52 and by notches 68 and 69 in the rim member 42 so that those surfaces 32 and 33 can engage corresponding portions of the flanges of a reel installed in the adapter unit 41. An unenclosed film reel of the appropriate type used in the reel adaptor unit 41 is shown at 70 in FIG. 1 and will be seen to be thinner than the similar reel 13 illustrated in the film magazine shown in FIG. 2. For example, as mentioned above, the reel 70 depicted in FIG. 1 might be appropriate for use with 16 mm. film whereas the reel 13 in the magazine would be adapted to accommodate 35 mm. film. To load a reel 70 into the adapter unit 41, the splined bore 71 of the reel 70 is fitted onto the spindle 12, which aligns it in concentric relation with the rim member 42 of the reel adapter unit 41 installed on support plate 11. The internal upper lip 49 of the adapter rim member 42 is of slightly greater internal diameter than the external diameter of a pair of reel flanges 72 and 74 so that the lower reel flange 72 engages the sloped surface 47 of the rim member 42. Accordingly, by simply pressing downwardly on the reel 70, the resilient rim member 42 expands radially to enable the lower reel flange 22 to pass downwardly past guide surface 46. Consequently, guide surface 46 is located laterally adjacent film roll 73 between the lower reel flange 72 and the upper reel flange 72 and the upper reel flange 74 when the resiliency of the rim member 42 restores it to its initial condition. In the assembled state, the rim member 42 now performs the same function as does the film magazine member and also serves to maintain the reel 70 in its proper axial position along the spindle 12. A thicker reel, e.g. a 35 mm. reel, can be installed in the adaptor unit 41 in exactly the same manner; in which case guide surface 46 surrounds only the lower portion of the film-strip but nevertheless serves to guide the leading end of the strip into the rim opening 45, from which it is fed into the film guide channel of the reader device.

Due to the fact that the rim member 42 projects inwardly between the flanges 72 and 74 of the film supply reel 70, it will be seen that the reel 70 cannot be lifted off the spindle 12 except by the application of sufficient lifting force to expand the rim member 42. Consequently, and particularly in the case of the reel 70 shown in FIG. 1, which is substantially flush with the top of the adapter unit 41 when installed therein, it would be quite difficult to remove the reel 70 by gripping and lifting its upper flange 74 without thereby removing the adapter unit 41 from the reader device. Therefore, the adapter unit 41 is provided with an ejector member comprising a thin flat plate 75 positioned above the adapter base plate 52 and below the installed film reel 70. The ejector plate 75 extends below and beyond the rim member 42 and is rockably attached to the base plate 52 by tabs 76 and 77 which extend downwardly through corresponding holes 78 and 79 in the base plate 52 as shown in FIG. 5. Above those two tabs 76 and 77, the corresponding end of the ejector plate 75 is bent upwardly to form a vertical, manually accessible lever ear 81 provided with a tongue 82 extending outwardly and downwardly in alinement with opening 83 (see FIG. 5). Another vertical ear 84 is formed on the base plate 52 and extends upwardly between tongue 82 and lever ear 81 to limit the rocking movement of the ejector plate 75 and to retain tabs 76 and 77 within the corresponding base plate holes 78 and 79 by means of horizontal finger 85 projecting from ear 84 into opening 83 of the lever ear. Accordingly, when the top end of the lever ear 81 is moved manually away from the film reel in the adapter unit 41, bifurcated end portions 86 of the ejector member rocks upwardly to lift the reel beyond the rim member 42, thus allowing the reel to be removed easily without disturbing the position of the adapter unit 41.

The invention has been described in detail with reference to preferred embodiments thereof, but it will be understood that variations and modifications can be effected within the spirit and scope of the invention as described hereinabove and as defined by the appended claims.

I claim:

1. Apparatus for enabling an unenclosed reel to be accommodated by a strip-handling device, the reel having a pair of flanges for receiving therebetween a strip with a leading end and wound in a coil, the strip-handling device including means for supporting the unenclosed reel for rotational movement in an unwinding direction, and strip-threading means for applying at a predetermined location, a transverse squeezing force to successive portions of at least one of the flanges as successive portions thereof are moved past the location to thereby remove the leading end from the coil;

said enabling apparatus comprising:
a. means for receiving the unenclosed reel and for providing a guide surface, said guide surface being disposed to retain the strip between the flanges when the unenclosed reel is within said receiving means, said receiving means including means for defining an opening for the passage of the strip therethrough; and
b. means associated with said receiving means for releasably attaching said enabling apparatus to the strip handling device.

2. Apparatus for enabling as claimed in claim 1, further comprising ejector means for removing the unenclosed reel from said means for receiving.

3. Apparatus for enabling as claimed in claim 1, wherein said receiving means comprises a substantially circular rim member, said rim member being expansible in a generally radial manner for receiving the unenclosed reel therein and for removal of the unenclosed reel from said rim member.

4. Apparatus as claimed in claim 1, wherein said attaching means disposes said receiving means so that the predetermined location is spaced rearwardly in the direction of unwinding rotation from said opening.

5. A reel adapter for enabling an unenclosed reel having a first strip wound in a coil thereon and having a pair of flanges, to be accommodated by a strip-handling device, the handling device including:
a. a reel spindle;
b. mounting means for removably positioning on the strip-handling device a magazine for storing therein a magazine reel, the magazine reel having a second strip wound in a coil thereon; and
c. strip-threading means cooperable with the magazine and the magazine reel for separating a leading end of the second strip wound about the magazine reel and for directing the strip along a path;

said reel adapter comprising:
1. a rim member for receiving the unenclosed reel, said rim member having a substantially cylindrical guide surface disposed towards the first strip wound upon the unenclosed reel, said rim member having an opening for the passage of the first strip;
2. a base member including means for defining a spindle aperture, means for supporting said rim member with respect to said base member, and positioning surfaces cooperable with the mounting means to locate said reel adaptor so that the reel spindle is disposed through said spindle aperture, that said guide surface substantially encircles the coil wound on the unenclosed reel disposed within said rim member, and that said opening is aligned with the path; and
3. ejector means for removing the unenclosed reel from said reel adapter while said reel adapter remains mounted upon the handling device.

6. A reel adapter according to claim 5 in which said ejector means comprises:
a. an ejector member disposed between said base member and the adjacent flange of the unenclosed reel installed in said reel adapter;
b. pivot means pivotally attaching said ejector member to said base member to provide rocking movement of said ejector member toward and away from said base member; and
c. a lever member extending from said ejector member to effect rocking movement of said blade member away from said base member in response to corresponding manual rocking movement of said lever member, thereby causing said ejector member to move the unenclosed reel from said base member and at least partially out of lateral alignment with said rim member without disturbing the position of said reel adapter relative to the handling device.

7. A reel adapter according to claim 6 in which said ejector member and said lever member comprise a one-piece unitary element pivotally mounted to said base member by a pair of pivot ears defined by said element and projecting through corresponding openings in said base member.

8. A reel adapter as claimed in claim 5, wherein said rim member and base member have recessed portions said recessed portions being disposed to permit the engagement of the strip-threading means with at least one of the flanges of the unenclosed reel.

9. Apparatus for releasably mounting an unenclosed reel upon a rotatable spindle, the unenclosed reel receiving a strip wound in a coil thereon and having first and second flanges of a first diameter, said apparatus comprising:
a. a rim member for receiving the unenclosed reel, said rim member having a guide surface disposed towards and circumferentially about the coil, said rim member having means for defining an opening for the passage of the strip and at least one flexible portion movable from a first position in which said guide surface tends to confine the strip within the unenclosed reel to a second position in which at least one of the the first and second flanges may be moved axially along the spindle; and
b. ejector means for removing the unenclosed reel from said rim member.

10. Apparatus as claimed in claim 9, wherein said guide surface is a substantially cylindrical surface of a second diameter less than the first diameter and is disposed coaxially with respect to the spindle when said flexible portion is in its first position.

11. Apparatus as claimed in claim 9, wherein said rim member includes a cam surface for engaging one of the first and second flanges, said ejector means operable to move the one flange into engagement with said cam surface to thereby dispose said flexible portion to said second position.

12. Apparatus as claimed in claim 9, wherein said rim member includes a second flexible portion, said first mentioned and second flexible portions located adjacent said opening, said apparatus further including stop means for limiting the movement of said first and second flexible portions.